INVENTOR.
JAMES D. COLE
BY
Golrick and Golrick
ATTORNEYS

INVENTOR.
JAMES D. COLE
BY Gobrick and Gobrick
ATTORNEYS

United States Patent Office 2,822,123
Patented Feb. 4, 1958

2,822,123

ELECTRIC MOTOR FAN UNIT FOR HAZARDOUS LOCATIONS

James D. Cole, Kent, Ohio, assignor, by mesne assignments, to American Machine and Metals, Inc., New York, N. Y., a corporation of Delaware Application May 16, 1955, Serial No. 508,441

6 Claims. (Cl. 230—117)

The present invention relates to an electric motor and fan unit for hazardous locations and more particularly to an electric motor and fan unit which is enclosed to prevent propagation of flame from the interior of the unit to the surrounding atmosphere.

In environments where combustible gases, finely divided solids, volatile combustible liquids such as gasoline and a great number of the now common organic solvents are used, there is the continual possibility that under some circumstances an explosive mixture of such materials with air may be formed. Hence considerations of safety require that any electric equipment, which involves the possibility of sparking or development of points of high temperature, must be enclosed in suitable casings to prevent ignition of any such combustible material or combustible or explosive mixtures thereof with surrounding air. In the case of electric motors including starting switches or commutator structures a suitable enclosure for the motor must be provided. By hindering access of the surrounding atmosphere to the several motor elements, such enclosures interfere with the ventilation and cooling of the motor and accordingly more expensive construction in the motor proper may be required to provide in a motor of desired power output a suitable service life.

It is an object of the present invention to provide a motor and fan unit with suitable enclosures for an electric motor, which is relatively simple in construction and assembly and readily disassembled and reassembled for servicing. It is another object of the invention to provide in a unit of the type described, an enclosed motor ventilation means for more effective cooling.

Other objects and advantages of the invention will appear from the following description of the drawings wherein.

Figure 1:
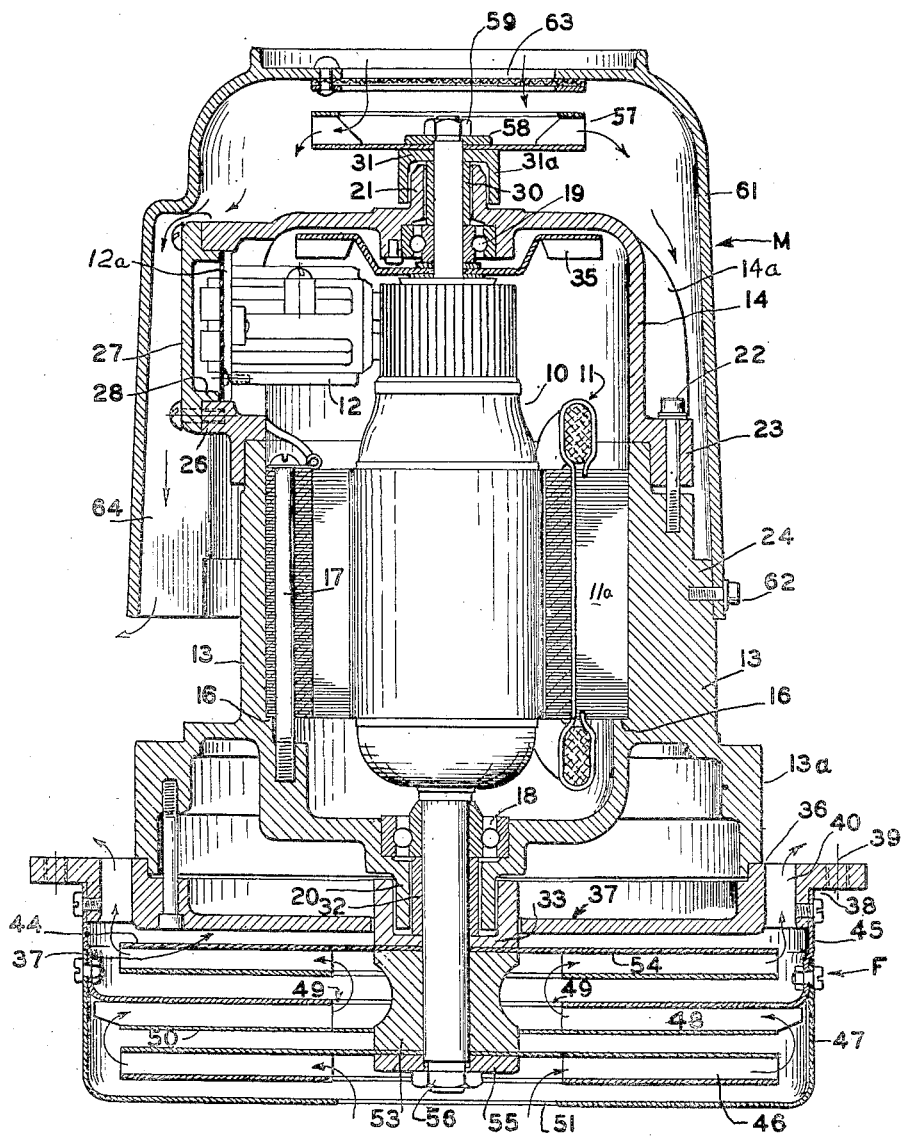
Fig. 1 is an axial sectional view of the motor and fan unit taken substantially as indicated by the line 1—1 in Fig. 2.

As may be seen from Fig. 1 in the drawings, the unit is comprised of a motor assembly and fan assembly indicated by the general reference numerals M and F. The motor shown is a commutator type motor—for which the invention is particularly advantageous—including an armature 10, a field structure 11, brush units 12, and an inner motor casing comprised of two opposed hollow or cup-shaped members, a lower motor casing member 13 as a fan end bracket and upper casing 14 as a commutator end bracket. In Fig. 1, the right half of the field structure is irregular with respect to the rest of the section showing one longitudinal groove 11a in the field core, a quadrant clockwise in Fig. 2 from the left brush unit, which accommodates a field coil retaining metal strip.

The lower casing member 13 is of generally cylindrical interior shape to receive the stack of riveted field core laminations fitted therein, and has a shoulder 16 near its lower end against which the bottom end edge of the field stack or core is clamped by bolts 17 passed longitudinally through the core and threaded into inward bosses in the lower part of the casing member. The outer races of ball bearing units 18, 19 on the lower and upper ends of the armature shaft are received in bearing sockets formed in the inner faces of the end walls of the casing members. The outer end wall of the socket in member 13 is flanged downwardly in a cylindrical or tubular extension 20 about the aperture through which the lower end of the shaft extends into fan assembly F. Suitable dust seal felts and washers, provided between the ball bearing unit 18 and the socket end wall, are omitted for clarity of the drawing.

The lower open end of casing member 14 is counterbored to fit on the reduced end of member 13 and clamped thereto by bolts 22 extended through arcuately apertured, externally projecting ledges or rim portions 23 into the threaded upper ends of radially projecting, circumferentially spaced integral blocks or thick ribs 24 on the outside of the lower member. At the top ball bearing socket, the outer race of the bearing may be retained by the overhanging head of screws threaded into interior face of the upper end wall of member 14, and on the outer face of the latter there is provided an integral tubular extension 21, similar to 20, about the aperture through which the upper end of the shaft projects. In diametrically located square bosses 26 projecting radially from the upper part of member 14, aligned radial bores each accommodate a brush holder assembly 12 inward of a brush cap or cover plate 27 bolted to the outer end of the boss 26. On the inner face of the cover plate, an annular flange 28 is fitted into the opening of the upper casing member. The base plate 12a of the brush assembly rests on, and is held by screws threaded into, ledge formations at the inner end of the brush receiving bore. Two diametrically located sets of integrally cast vertical lateral ribs 14a provide external cooling fins spaced along the external circumference of the upper member between the bosses 26.

At the upper end of the shaft a spacer sleeve 30 bears on the inner race of the upper bearing through elements hereinafter described and supports a cup-shaped shield member or cylindrically flanged apertured disk 31 centered on the shaft. With suitable running clearance sidewise and endwise between the stationary portions, flange 21 and end wall of member 14, and the adjacent movable elements, the sleeve 30 and disk 31 with skirt flange 31a forming an annular recess for flange or extension 21, in effect there is formed a rotary seal preventing flame propagation from the interior of the motor to the external atmosphere by virtue of the long, close and tortuous path which would be required therebetween. A similar arrangement is afforded at the lower casing member 13 by spacer sleeve 32 and cylindrically flanged disk 33. The inner flange of the brush cover plates serve a like purpose.

Within the motor casing proper formed by members 13, 14 air circulation is induced by a fan 35 mounted on the upper end of the shaft between the commutator end and the inner race of the upper ball bearing unit, the longitudinal grooves 11a in the generally cylindrical exterior surface of the field core permitting some air circulation between the field lamination stack and casing member 13, in addition to that between armature and field.

At the lower end of members 13, on an integrally formed endwise projecting, rabbeted rim 13a, there is fitted the oppositely directed, counterbored annular rim portion 36 of a centrally apertured disk member 37 with a small running clearance relative to the cylindrical flange of 33. Member 37, bolted to rim 13a, serves as an end wall and baffle plate in the fan unit F. In disk member 37, between the shouldered outer periphery 38 with mounting bolt apertures 39 and the inner rim 36 fitted to the lower casing member, there is a circumferential series of wide arcuate openings 40 for an axially directed exhaust outlet of the fan assembly F.

In the fan assembly F, a housing for a second centrifugal stage fan 44 is formed by disk member 37 and a drawn or spun metal shallow cup-shaped element 45, the cylindrical wall portion of the latter being fitted to the shoulder portion 38 of the disk member 37 and secured by screws or the like. A housing for the first stage fan 46 is provided by a second cup-shaped member 47 having a main suction inlet 51 and fitted onto and secured to a reduced end portion of the cup member 45. On the radial wall of the member 45 are secured air guide vanes 48 extending from the inlet aperture 49 of the second stage fan out toward the cylindrical wall of member 47, which vanes carry an annular plate 50 circumferentially spaced from 47 for air passage from the first stage fan. A spacer sleeve member 53, semi-circularly grooved about its circumference as an air guide between the first and second stage fans, clamps the central area of the back disk 54 of the second stage fan 44 against the face of disk 33, and a washer 55 held by clamp nut 56 on the threaded end of the shaft similarly clamps the first stage fan 46 against member 53. A shaft shoulder which the inner race of bearing 18 abuts affords through the inner race and sleeve 32 the clamping reaction force for the entire fan assembly. The external motor cooling centrifugal fan 57 in similar fashion is clamped on the upper end of the shaft against disk 31 by a washer 58 and clamping nut 59.

Spaced from the motor casing comprised of members 13 and 14, there is an external motor housing or fan cover member 61 which at its lower open end is fitted to spacer ribs 24 on member 13 and secured by screws 62. The upper end wall is centrally apertured at 63 to provide an air inlet to the center of the fan 57 for an external motor cooling. The more or less rectangular lateral integral bays 64 accommodate the projecting brush housings elements of member 14, permitting the outer housing 61 to be slid into position on the inner motor casing, and providing air outlet passages between the inner casing and housing 61 in addition to those formed between the projections and the ribs 14a.

Figure 2:
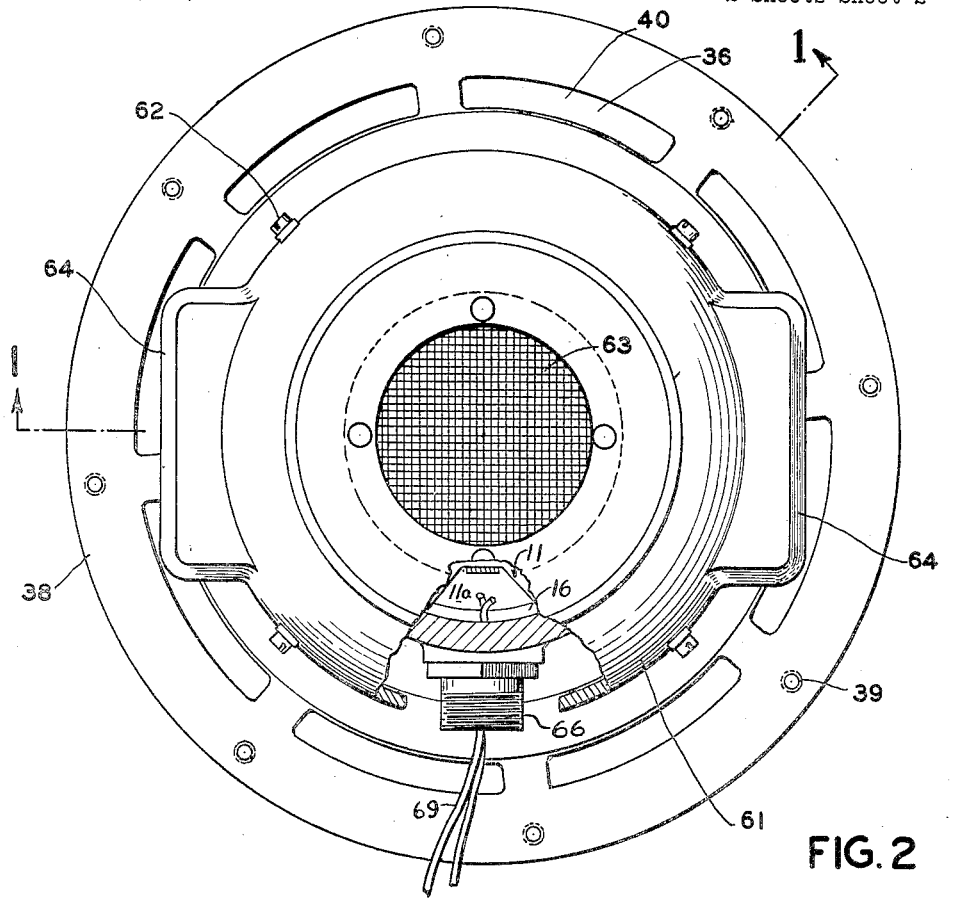
Fig. 2 is an end view of the motor and fan unit taken from the motor end of the fan.
Figures 3, 4:
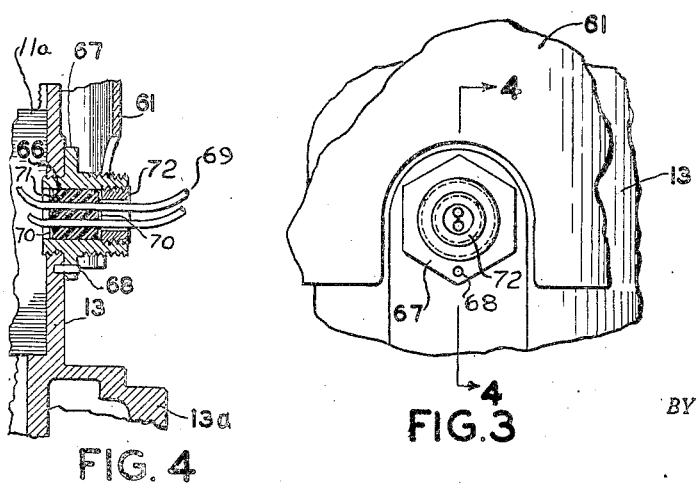
Fig. 3 is a detail of the casing showing the manner of bringing electric supply lines therethrough.
Fig. 4 is a section taken along the line 4—4 in Fig. 3.

As shown in Fig. 2 a sealed motor wire lead-in fixture is provided, at a quadrant location from the brush positions coincident with one of the external longitudinal grooves 11a of the field, so that the wires may be run through the space between the groove and casing members 13, 14 to the end of the field for brush or field connections as the particular motor type requires. As a lead packing gland (Figs. 3 and 4 wherein member 14 is omitted), a hollow stud 66 having a hexagonal wrench flange 67 and one end threaded into lower casing member 13 is locked against rotation by a pin 68 driven into a hole drilled through the flange 67 and into the casing after the stud is seated. The motor leads 69 are brought through spaced lead support disks 70 in the stud, the intervening space being filled with an initially semi-solid lead packing material 71, which is compressible as needed by the packing gland screw 72 bearing on outer disk 70.

In the disclosed structure, the air within the motor casing is circulated to aid distribution of heat among the internal elements by forced convection as well as conduction, thereby avoiding undue localized heating, especially at the brush assemblies. Heat transferred by such circulation and by contact of the field core with the casing members is dissipated by the forced air stream blown by fan 57 about the casing members 13 and 14.

By the use of materials relatively non-sparking under impact, such as aluminum in the suction fans and housing elements and the alloys applicable for die casting in the motor casings 13, 14, and of disk member 37 which are of structure particularly adapted to die casting production, the disclosed structure further offers little opportunity for ignition of combustible mixtures by friction or impact sparks caused by hard materials passing through the suction fan assembly.

I claim:

1. In an explosion-proof electric vacuum cleaner motor and fan assembly: a motor stator and a rotor therein having a shaft; a hollow motor casing for said stator and rotor having opposite end walls apertured to receive the ends of the shaft extending therethrough, the casing being otherwise closed to the atmosphere; fan means carried at one end of the rotor within the casing for inducing heat distributing air circulation internally of the casing; rotary seal means between each end of the shaft and the adjacent casing end wall for hindering flame propagation from the interior to exterior of the casing comprising a tubular extension integral with the corresponding end wall about the shaft receiving aperture thereof, and means carried by the shaft providing an annular recess about the shaft receiving said extension; a centrifugal motor ventilating fan carried by the shaft outboard of said seal means at one end of the casing; an external motor housing surrounding the last said one end of the casing having an end wall with an air inlet opening axially to the centrifugal fan and a skirt portion extending from its end wall over and spaced from the major part of the casing length providing cooling air flow space externally along the casing; said skirt portion being secured at circumferentially spaced points along its free edge to said casing and having axially directed exhaust openings external to the casing; said casing having external cooling fins in said air flow space; and a suction fan assembly including a centrally apertured disk member on the end of said casing opposite the said centrifugal fan with the shaft projecting therethrough and having adjacent its outer periphery a series of suction exhaust outlets opening along the side of the casing, a centrifugal suction fan on the projecting portion of the shaft, and a suction fan housing member mounted on the disk member.

2. In an explosion-proof electric vacuum cleaner motor and fan assembly: a motor stator and a rotor therein having a shaft; a hollow motor casing for said stator and rotor having in opposite end walls inwardly open bearing receiving sockets apertured to receive the ends of the shaft extending through the end walls, the casing being otherwise closed to the atmosphere; anti-friction bearings with outer races in said sockets and inner races on the shaft ends; fan means carried on the shaft within the casing between one end of the rotor and the inner race of an adjacent bearing for heat distributing air circulation internal to the casing; rotary seal means between each end of the shaft and the adjacent casing end wall for hindering flame propagation from the interior to exterior of the casing comprising an external tubular extension integral with the end wall about the aperture thereof, a cup-shaped shield having a disk portion centrally apertured for the shaft spaced from the end of the tubular extension and having a cylindrical skirt about the said extension and a spacer sleeve on the shaft between the corresponding inner bearing race and the said disk portion providing an annular recess about the shaft receiving said extension; a centrifugal fan carried by the shaft outboard of said shield at one end of the casing; an external motor housing surrounding the last said one end of the casing having an end wall with an air inlet opening axially to the centrifugal fan and a skirt portion extending over and spaced from the major part of the casing length providing circumferential cooling air flow space along the casing; and a suction fan assembly including a centrally apertured disk member on the end of said casing opposite the said centrifugal fan with the shaft and shield of the corresponding rotary seal projecting therethrough and having adjacent its outer periphery a series of suction exhaust outlets opening along the side of the casing, a centrifugal suction fan on the projecting portion of the shaft clamped at its central portion against the disk portion of the projecting shield, and a suction fan housing member mounted on the disk member.

3. In an explosion-proof electric vacuum cleaner motor and fan assembly: a motor stator and a rotor therein having a shaft; two cup-like casing members with open ends fitted and secured together forming a hollow closed motor casing for said stator and rotor, said casing members having in opposite end wall portions inwardly open aligned bearing receiving sockets apertured to receive the ends of the shaft extending therethrough, the inner wall of said casing and said stator being mutually adapted in shape to form air passages within the casing lengthwise of the stator; anti-friction bearings with outer races in said sockets and inner races on the shaft ends; fan means carried on the shaft within the casing between one end of the rotor and the inner race of an adjacent bearing for heat distributing air circulation internal to the casing; rotary seal means between each end of the shaft and the adjacent casing end wall portion for hindering flame propagation from the interior to exterior of the casing comprising a tubular extension integral with the end wall portion about the aperture thereof, a cup-shaped shield having a disk portion centrally apertured for the shaft spaced from the end of the tubular extension and having a cylindrical skirt about the said extension and a spacer sleeve on the shaft between the corresponding inner bearing race and the said disk portion, thereby providing an annular recess about the shaft receiving said extension; a centrifugal fan carried by the shaft outboard of said shield at one end of the casing; an external motor housing surrounding the last said one end of the casing having an end wall with an air inlet opening axially to the centrifugal fan and a skirt portion extending over and spaced from the major part of the casing length providing cooling air flow space along the casing; and a suction fan assembly including a centrally apertured disk member on the end of said casing opposite from said centrifugal fan with the shaft and shield of the corresponding rotary seal projecting therethrough and having adjacent its outer periphery a series of suction exhaust outlets opening along the side of the casing, a centrifugal suction fan on the projecting portion of the shaft clamped at its central portion against the disk portion of the projecting shield, and a suction fan housing member mounted on the disk member.

4. In an explosion-proof electric vacuum cleaner motor and fan assembly: a motor stator and a rotor therein having a shaft; two cup-like casing members with open ends fitted and secured together forming a hollow closed motor casing for said stator and rotor, said casing members having in opposite end wall portions inwardly open aligned bearing receiving sockets apertured to receive the ends of the shaft extending therethrough, the inner wall of said casing and said stator being mutually adapted in shape to form air passages within the casing lengthwise of the stator; anti-friction bearings with outer races in said sockets and inner races on the shaft ends; fan means carried on the shaft within the casing between one end of the rotor and the inner race of an adjacent bearing for heat distributing air circulation internal to the casing; rotary seal means between each end of the shaft and the adjacent casing end wall portion for hindering flame propagation from the interior to exterior of the casing comprising a tubular extension integral with the end wall portion about the aperture thereof, a cup-shaped shield having a disk portion centrally apertured for the shaft spaced from the end of the tubular extension and having a cylindrical skirt about the said extension and a spacer sleeve on the shaft between the corresponding inner bearing race and the said disk portion, thereby providing an annular recess about the shaft receiving said extension; and a centrifugal fan carried by the shaft outboard of said shield at one end of the casing; an external motor housing surrounding the last said one end of the casing having an end wall with an air inlet opening axially to the centrifugal fan and a skirt portion extending over and spaced from the major part of the casing length providing cooling air flow space along the casing.

5. In an explosion-proof electric vacuum cleaner motor and fan assembly: a motor stator and an armature therein having a shaft; two cup-like casing members with open ends fitted together along surface portions coaxial with said shaft forming a hollow closed motor casing for said stator and rotor and having in opposite end wall portions inwardly open aligned bearing receiving sockets apertured to receive the ends of the shaft extending therethrough; one of the casing members and said stator being mutually adapted in shape for seated reception of the stator through the open end of said one casing member and to form air passages within the casing lengthwise of the stator; the other casing member mounting and enclosing brush holder units inwardly disposed radially to the commutator of the armature; releasable means securing said casing members together and permitting limited rotational movement between the casing members upon release whereby the relative brush and stator position may be adjusted; anti-friction bearings with outer races in said sockets and inner races on the shaft ends; fan means carried on the shaft within the casing between the commutator of the armature and the inner race of an adjacent bearing for heat distributing air circulation internal to the casing; rotary seal means between each end of the shaft and the adjacent casing end wall portion for hindering flame propagation from the interior to exterior of the casing comprising a tubular extension integral with the end wall portion about the aperture thereof, a cup-shaped shield having a disk portion centrally apertured for the shaft spaced from the end of the tubular extension and having a cylindrical skirt about the said extension and a spacer sleeve on the shaft between the corresponding inner bearing race and the said disk portion, thereby providing an annular recess about the shaft receiving said extension; a centrifugal fan carried by the shaft outboard of said shield at one end of the casing; an external motor housing surrounding the last said one end of the casing and having an end wall with an air inlet opening axially to the centrifugal fan and a skirt portion extending over and spaced from the major part of the casing length providing cooling air flow space along the casing; and a suction fan assembly including a centrally apertured disk member on the end of said casing opposite from said centrifugal fan with the shaft and shield of the corresponding rotary seal projecting therethrough and having adjacent its outer periphery a series of suction exhaust outlets opening along the side of the casing, a centrifugal suction fan on the projecting portion of the shaft clamped at its central portion against the disk portion of the projecting shield, and a suction fan housing member mounted on the disk member.

6. In an explosion-proof electric motor assembly: a motor stator and an armature therein having a shaft; two cup-like casing members with open ends fitted together along surfaces coaxial with said shaft forming a hollow closed motor casing for said stator and rotor, said members having in opposite end wall portions inwardly open aligned bearing receiving socket apertured to receive the ends of the shaft extending therethrough; one of the casing members and said stator being mutually adapted in shape for seated reception of the stator through the open end of said one casing member and to form air passages within the casing lengthwise along the exterior of the stator; the other casing member mounting and enclosing brush holder units inwardly disposed radially to the commutator of the armature; releasable means securing said casing members together and permitting upon release limited rotational movement between the casing members whereby relative brush and stator position may be adjusted; anti-friction bearings with outer races in said sockets and inner races on the shaft ends; fan means carried on the shaft within the casing between the commutator of the armature and the inner race of the adjacent bearing for heat distributing air circulation internal to the casing; rotary seal means between each end of the shaft and the adjacent casing end wall portion for hindering flame propagation from the interior to exterior of the casing comprising a tubular extension integral with the end wall portion about the aperture thereof, a cup-shaped shield having a disk portion centrally apertured for the shaft spaced with running clearance from the end of the tubular extension and having a cylindrical skirt about the said extension and a spacer sleeve on the shaft between the corresponding inner bearing race and the said disk portion, thereby providing an annular recess about the shaft receiving said extension; a centrifugal fan carried by the shaft outboard of said shield at the brush end of the casing; and an external motor housing surrounding the brush end of the casing having an end wall with an air inlet opening axially to the centrifugal fan and a skirt portion extending over and spaced from the major part of the casing length providing cooling air flow space along the casing.

References Cited in the file of this patent

UNITED STATES PATENTS

| | | |
|---|---|---|
| 1,918,695 | Gilbert | July 18, 1933 |
| 2,321,126 | Breuer | June 8, 1943 |
| 2,364,877 | Smellie | Dec. 12, 1944 |
| 2,693,312 | Lanter | Nov. 2, 1954 |
| 2,713,455 | Cole | July 19, 1955 |